(12) United States Patent
Lynn

(10) Patent No.: US 9,846,052 B2
(45) Date of Patent: Dec. 19, 2017

(54) ELECTRONIC ROUTE CREATION

(71) Applicant: Blackriver Systems, Inc., Madison, WI (US)

(72) Inventor: Eric Lynn, Madison, WI (US)

(73) Assignee: BLACKRIVER SYSTEMS, INC., Madison, WI (US)

( * ) Notice: Subject to any disclaimer, the term of this patent is extended or adjusted under 35 U.S.C. 154(b) by 0 days.

(21) Appl. No.: 15/142,563

(22) Filed: Apr. 29, 2016

(65) Prior Publication Data

US 2017/0314955 A1    Nov. 2, 2017

(51) Int. Cl.
  *G01C 21/36*    (2006.01)
  *G06F 17/30*    (2006.01)

(52) U.S. Cl.
  CPC ... *G01C 21/3667* (2013.01); *G06F 17/30241* (2013.01); *G06F 17/30867* (2013.01)

(58) Field of Classification Search
  CPC .......... G01C 21/3667; G06F 17/30241; G06F 17/30867
  USPC ...................................................... 701/533
  See application file for complete search history.

(56) References Cited

U.S. PATENT DOCUMENTS

| | | | |
|---|---|---|---|
| 6,115,669 A | 9/2000 | Watanabe et al. | |
| 6,341,255 B1 | 1/2002 | Lapidot | |
| 7,162,363 B2 | 1/2007 | Chinitz | |
| 7,920,965 B1 | 4/2011 | Nesbitt et al. | |
| 7,934,983 B1 * | 5/2011 | Eisner | A63K 1/00 340/7.48 |
| 8,335,646 B2 | 12/2012 | Nesbitt | |
| 8,489,314 B2 | 7/2013 | Nortrup | |
| 8,620,532 B2 | 12/2013 | Curtis et al. | |
| 8,934,995 B2 * | 1/2015 | Eisner | G06F 15/17306 700/91 |
| 9,097,890 B2 * | 8/2015 | Miller | G02B 27/0093 |
| 9,097,891 B2 * | 8/2015 | Border | G02B 27/0093 |
| 9,129,295 B2 * | 9/2015 | Border | G02B 5/23 |
| 9,229,227 B2 * | 1/2016 | Border | G02B 27/0093 |

(Continued)

FOREIGN PATENT DOCUMENTS

WO    2013/100752    7/2013

OTHER PUBLICATIONS

Huang et al., Schedule Arrangement on Mobile Devices in a GIS Environment, 2010, IEEE, p. 334-339.*

(Continued)

*Primary Examiner* — McDieunel Marc
(74) *Attorney, Agent, or Firm* — Greenblum & Bernstein, P.L.C.

(57) ABSTRACT

A method of creating an electronic travel route includes providing a user interface that includes electronic geographic maps. Routes created by users using the user interface are stored. The routes include mapped electronic routes along which the users have traveled. The method includes receiving geographic information and a request from a requester to create a new route. A set of the routes created are provided to the requester based on the geographic information. Selections of portions of the set of the routes are accepted to create the new route. Based on the new route, a processor of a computer is used to create a set of geographic markers and instructions for traversing the new route. The new route and instructions for traversing the new route are provided based on a search.

20 Claims, 10 Drawing Sheets

(56) References Cited

U.S. PATENT DOCUMENTS

| | | | |
|---|---|---|---|
| 9,285,589 B2* | 3/2016 | Osterhout | G02B 27/017 |
| 9,310,888 B2* | 4/2016 | Dickinson | G06F 3/017 |
| 9,341,843 B2* | 5/2016 | Border | G02B 27/0093 |
| 9,366,862 B2* | 6/2016 | Haddick | G02B 27/0093 |
| 2004/0044465 A1 | 3/2004 | Nesbitt | |
| 2005/0256641 A1 | 11/2005 | Ollis et al. | |
| 2006/0206261 A1 | 9/2006 | Altaf et al. | |
| 2014/0067265 A1 | 3/2014 | Maston | |
| 2015/0348512 A1 | 12/2015 | Sabatelli | |

OTHER PUBLICATIONS

Wu et al., CET: Corner Extraction Technique for Efficient Characterization of GPS Tracks, 2014, IEEE, p. 110-115.*

Yuang et al., Map Matching of Mobile Probes based on Handover Location Technology, 2010, IEEE, p. 587-592.*

* cited by examiner

Computer

Map 1030

ELECTRONIC ROUTE CREATION

BACKGROUND

1. Field of the Disclosure

The present disclosure relates to the field of electronic mapping. More particularly, the present disclosure relates to creating routes on electronic maps.

2. Background Information

Electronic maps have been available via the internet and pre-programmed or programmable global positioning satellite (GPS) devices for at least 10 years. These electronic maps have long been used to provide travel directions for travelers in vehicles. A common source for electronic maps today is Google Maps™, though other sources exist. Additionally, a common source for global positioning satellite devices capable of providing travel directions is Garmin™.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
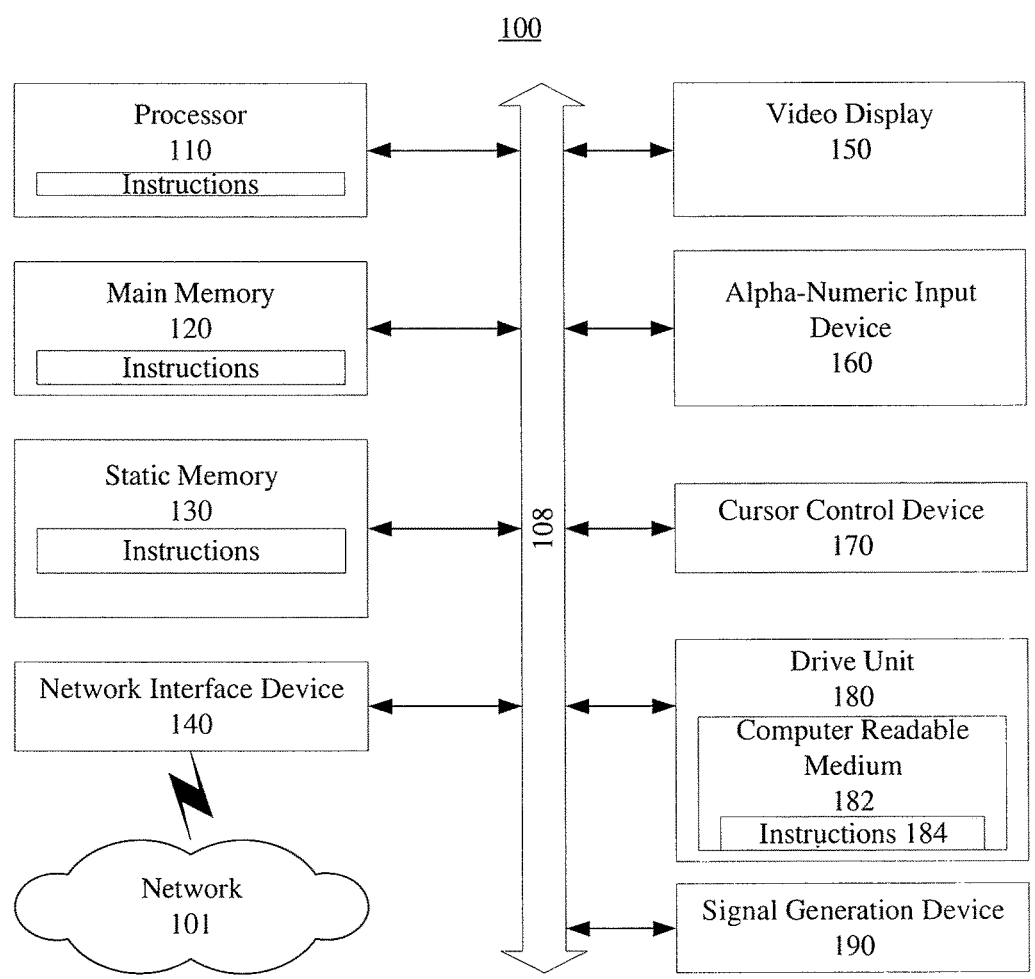
FIG. 1 shows an exemplary general computer system that includes a set of instructions for electronic route creation, according to an aspect of the present disclosure.

FIG. 1 is an illustrative embodiment of a general computer system, on which a method of electronic route creation can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a web appliance, a web server, an application server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
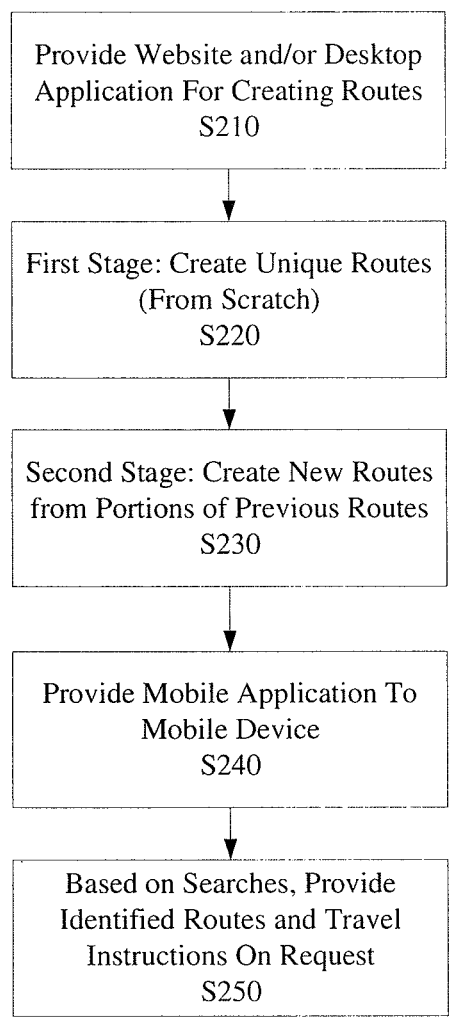
FIG. 2 shows an exemplary method for electronic route creation, according to an aspect of the present disclosure.

FIG. 2 shows an exemplary method for electronic route creation, according to an aspect of the present disclosure. In FIG. 2, the process starts at S210 by providing a website and/or a desktop application for creating routes. Such a website or desktop application provides electronic maps for areas in which routes can be provided. The electronic maps may include a variety of levels of detail, ranging from electronic maps that only include public streets and street names, to more detailed maps that include individual buildings, parking lots, and sidewalks. Electronic maps may include details indicating pavement for roads and sidewalks, as well as unpaved roads and trails.

At S220, the first stage of electronic route creation includes creating unique routes from scratch. A unique route may be an initial new travel route traveled by a user, such as a bicyclist. The creator interacts with an electronic map to trace a route which the creator can confirm as traversable. The route may include paved roads, sidewalks, dedicated trails including unpaved trails, parking lots, alleyways, and other forms of surfaces on which another individual can travel, such as by bicycle.

At S230, a second stage of electronic route creation includes users creating new routes from portions of previous routes. The previous routes include unique routes created at S220, and these previous routes may be accompanied by information of the creator(s) of the previous routes, as well as creation dates, difficulty level, details such as convenience to a starting point or finishing point or how accessible the previous route is or how "rough" (in teens of terrain) the previous route is, and so on. The second stage at S230 includes users interacting with the previous routes to select individual portions different previous routes to create a new route. The second stage at S230 may also include the users adding details, such as to join two or more portions of two different previous routes when creating the new route.

Different users may have different authorizations in the process in FIG. 2. For example, one group of users and entities may be authorized to create unique routes at S220 and new routes at S230, and another group of users or entities may be authorized only to create the new routes at S230.

Route data used to create a new route at S220 can come from a variety of sources, including one or more types of users under a group (e.g., business or premium) account. In the example where routes are created for bicyclists, one class of accounts may be provided for businesses. Businesses can include bicycle retailers, event promotors, the entity that provides electronic route creation, local proprietors, bicycle brands, etc. One class of account may be provided for governmental and/or quasi-governmental entities such as municipalities, bike-share programs, and tourist boards. Users creating routes under either of these types of accounts may be assumed to be relatively "expert", in possession of knowledge and familiarity with local bicycling options. Businesses may also know that their brands will reflect the routes they share, and will work hard to make sure these are the best routes available. As a result, when either of these classes of accounts is used to create a route for users in the system to ride or use in the electronic route builder to build new routes, the route created under the business or governmental account can be designated with a label such as a "Classic Route". The different authorization levels means that such labelled routes are only created by users under such authorized accounts and are designated as such by such users.

New routes created at S220 and S230 may be created by users under the accounts noted above as well as under other types of accounts such as those used by individual users of the electronic route creation. These accounts may be labeled, e.g., "Regular Rider Accounts". This data exists to designate an everyday customized ride, and may not carry any implications as to the source of such a new route being a particularly good source.

When searching for created routes or new routes, users can filter the results determined by a processor searching through a database. For example, users can filter ride results before using electronic route creation, and thus reflecting what the individual users find important. A website user interface may include a search box and/or check/uncheck options for users to use to find different routes. The website user interface can then provide a list of routes and a map that shows routes selected by the user. The routes may be correlated with numerous types of data, such as:
- search origin (city, state, zip code)
- length/distance (in miles or kilometers)
- expertise level
- surface type (paved, unpaved)
- ride type (commute)
- distance (0-100+ miles/kilometers)
- search radius from current position (0-100+ miles/kilometers)
- likes/favorites (how many previous users have "liked" the route)
- author
- name of route
- difficulty of route (e.g., easy, medium, hard)

At S240, a mobile application is provided to a mobile device. A mobile device may obtain a mobile application from an online store such as the Google Playstore™ or the Apple™ Store. The mobile device can then be used by a user to obtain one or more of the new routes created at S230, so that a user can travel the new route using a map on which the route is superimposed, and/or individual directions provided by the mobile application. Directions can be provided visually as written instruction or using indicators such as arrows, and can also be provided verbally such as turn by turn instructions using a voice and language selected by the user.

The user can use the mobile application to search for routes. The user may provide geographic input to the application to perform the search. The geographic input may be a zip code, city or town name, street name, business name, or other forms of geographic input that can be used to narrow a search on an electronic map to a particular area. The search may result in the mobile application providing one or multiple identified potential routes to the user performing the search at S250, so that the user can select an identified route and begin traveling the route once at an appropriate location to start traveling the route.

In an example, search results may include multiple route labels for new routes returned from a search. Each route may include designations such as distance, creator, whether the user has previous viewed or even completed the route, and so on. The user can select multiple routes, and then hit a "build from selected" soft button on the website user interface, so that the routes are shown on a map, and made individually selectable by portion as described herein.

Figure 3:
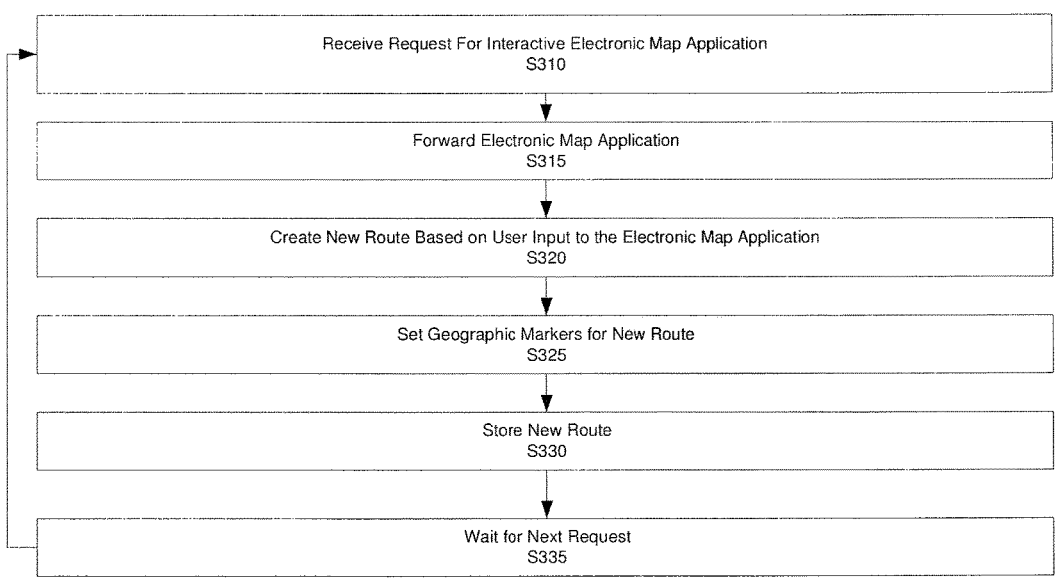
FIG. 3 shows an exemplary method for electronic route creation, according to an aspect of the present disclosure.

FIG. 3 shows an exemplary method for electronic route creation, according to an aspect of the present disclosure. The process in FIG. 3 starts at S310 when a request for an interactive electronic map application is received. At S315, the electronic map application is forwarded, such as by a link sent to an email address, or directly to a requesting device on which the electronic map application will be installed.

At S320, a new route is created based on user input to the electronic map application. For example, a user may drag a finger across a touch screen of the device or an attached monitor. Alternatively, the user may drag an electronic wand across a screen that correlates positions of the wand to positions on the screen. As another alternative, the user may manipulate a cursor on a screen using, for example, a mouse or other cursor control device. The route is superimposed on an electronic map using the positions indicated by the finger, wand, cursor or other input mechanism.

At S325, geographic markers are set for the new route. The geographic markers may be specific place indications, such as markers of particular intersections, businesses, natural or man-made landmarks, visible signs, and so on. Geographic markers may also be preset coordinates such as electronic GPS markers forming a path. The markers are noted along the route as places a user can use to confirm their travel.

At S330 the new route is stored, and at S335 the process waits for the next request for an application before restarting the process at S310. The new route may be stored in a centralized database that stores new routes from multiple users authorized to create routes, and may be correlated in the database with geographic indications that will help users searching for routes to obtain the new route.

Figure 4:
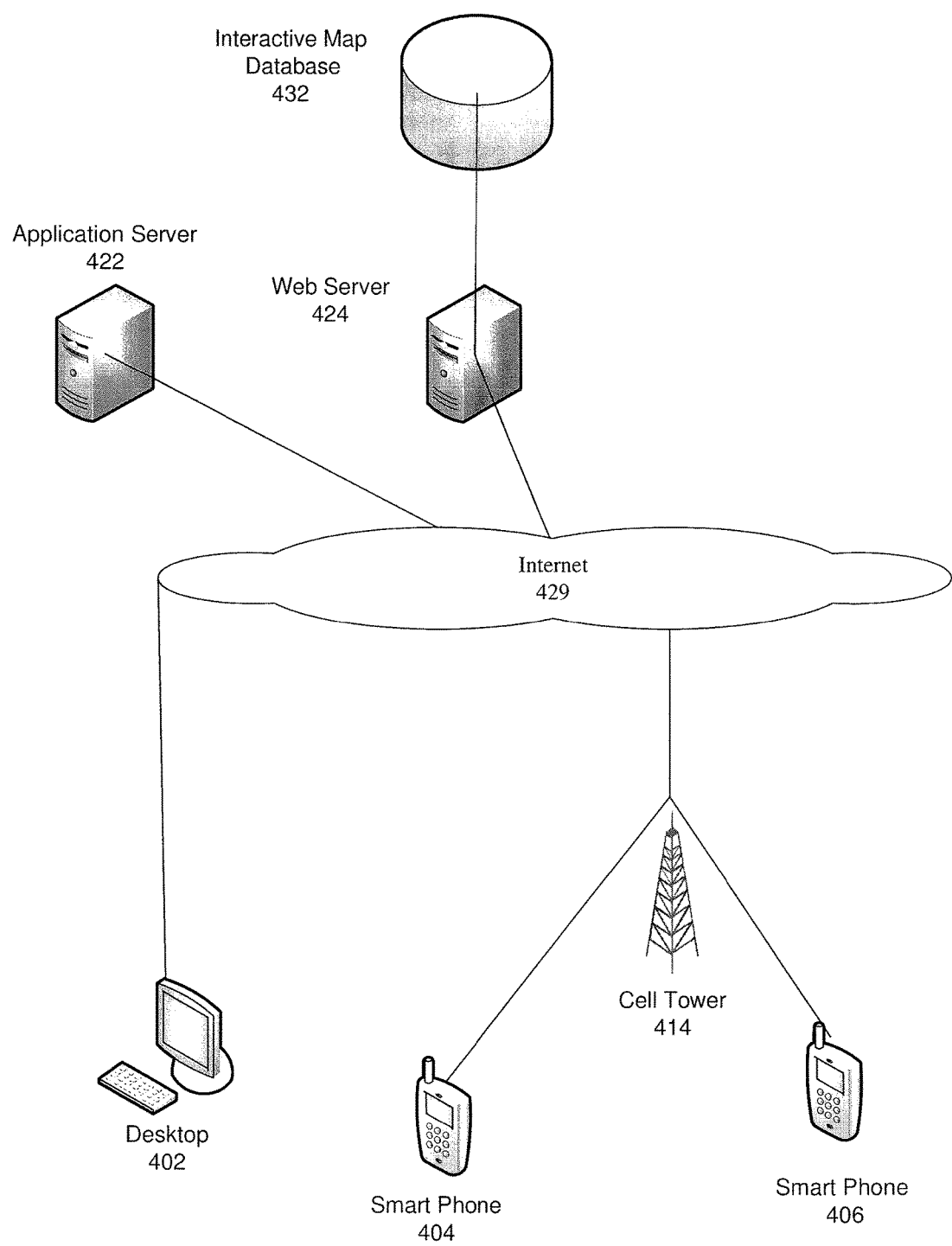
FIG. 4 shows an exemplary network for electronic route creation, according to an aspect of the present disclosure.

FIG. 4 shows an exemplary network for electronic route creation, according to an aspect of the present disclosure. In FIG. 4, a variety of user devices include a desktop computer 402, a smart phone 404, and a smart phone 406. These user devices are representative of user devices that can be used by users to communicate via networks that include the internet 429.

The smart phones 404 and 406 communicate via cell tower(s) 414 in a cellular network. Cell tower(s) 414 are representative of wireless towers on which antennas are placed. The antennas carry receive and transmit data in a data network, and can be connected to broadband landline networks as well as to other antennas on other wireless towers. In the example of FIG. 4, smart phones 404 and 406 are representative of mobile devices that can be carried by a user using an electronic route creation application installed on the mobile devices. The users can travel along a route created using the electronic route creation, or can use the electronic route creation application to track their travel so as to create a new route using the electronic route creation application.

The desktop 402 communicates via a landline connection, but may also communicate via a wireless fidelity (WiFi) or other local wireless connection. In the example of FIG. 4, desktop 402 is representative of a device that can be used by a user visiting an electronic route creation website or using an electronic route creation application installed on the device. The users may be high level users (e.g., "expert" users) who use the desktop 402 to design initial routes, or may be any user who uses the desktop 402 to create new routes from existing routes in the manner described herein.

Application server 422 provides a route creation application to desktop 402 and smart phones 404 and 406. For example, the application server 422 may provide a route creation application on-demand via the Google Playstore™ or the Apple™ Store. A route creation application may be used by high level users to create initial new routes by high level users, or by any user to create new routes from existing routes. As described herein, when a new route is initially created using a desktop 402 or analogous device, the high level user obtains an electronic map and provides input to identify the route. The input may be provided via a touch screen as a user physically traces the route, or by a cursor moved across the screen via a mouse or other cursor control device, or by confirming a series of individual cursor positions using, for example, a button on the mouse or a keyboard. The initial new route is superimposed on the electronic map. The high level user creating the route may also add information to the initial new route, such as notes, comments, and geographic markers.

The high level user creating the new route may also edit or modify the initial new route after it is created, such as by moving, erasing, or adding a portion of the route. For example, the high level user may revisit a new initial route sometime after the new initial route is created, and edit the new initial route to correct errors or improve or otherwise modify the route. Additionally, other users who review or travel the new initial route may report problems to the high level route via the electronic route creation application. For example, an internal messaging system provided via the electronic route creation application may allow one user to send information via email or other electronic message to the route creator (without obtaining the route creator's email address). Alternatively, users may be allowed to post comments on a message board that accompanies a new initial route. The route creator or administrator can then address comments, such as by correcting errors in new initial route or by responding to emails or other electronic message or comments to provide explanations.

In FIG. 4, a web server 424 is used to provide a webpage for electronic route creation. An interactive map database 432 stores electronic routes that are created. The interactive map database 432 may store maps, electronic routes superimposed on the maps, geographic information associated with locations and areas on the electronic maps, and any information entered by the creator. Information associated with a particular electronic route can include geographic indicators, characteristics of the route creator, characteristics of the electronic route, and other forms of information derived from the electronic map(s) on which the route exists or from input by the route creator, an administrator, or other users.

A user visiting the webpage may search for electronic routes using a variety of criteria correlated with electronic routes in the database 432. For example, a user may search for electronic routes by geographic indicators such as zip code, street names, town or city names, state names, county names, and neighborhood names. A user may also search for electronic routes by characteristics of the route creator, such as by name, expertise level, popularity, ratings provided by other users, and so on. The user may also search for electronic routes by characteristics of the electronic routes, such as by specifying that route must all be paved or unpaved, or that the route be restricted to paths that do not allow motor vehicles, or that a route must have a particular difficulty level.

As described with respect to FIG. 4, an electronic route creation provider may provide a website and/or downloadable software applications via the web server 424 and application server 422. Users can then create new initial routes, if authorized by the provider. The new initial routes are stored in an interactive map database 432, along with information that is correlated with the new initial routes such as geographic information, route creator information, or other types of route information. Other users can create new routes from existing routes, by selecting sections of routes that either intersect or are close together, in order to create a new route from confirmed routes created by others. Sections, as the term is used herein, are portions of routes, for example, defined by two endpoints such as points selected on an electronic map, intersections or landmarks. Users can then travel on both new initial routes and the new routes created from existing routes and follow instructions provided by the electronic route creation application.

Figure 5:
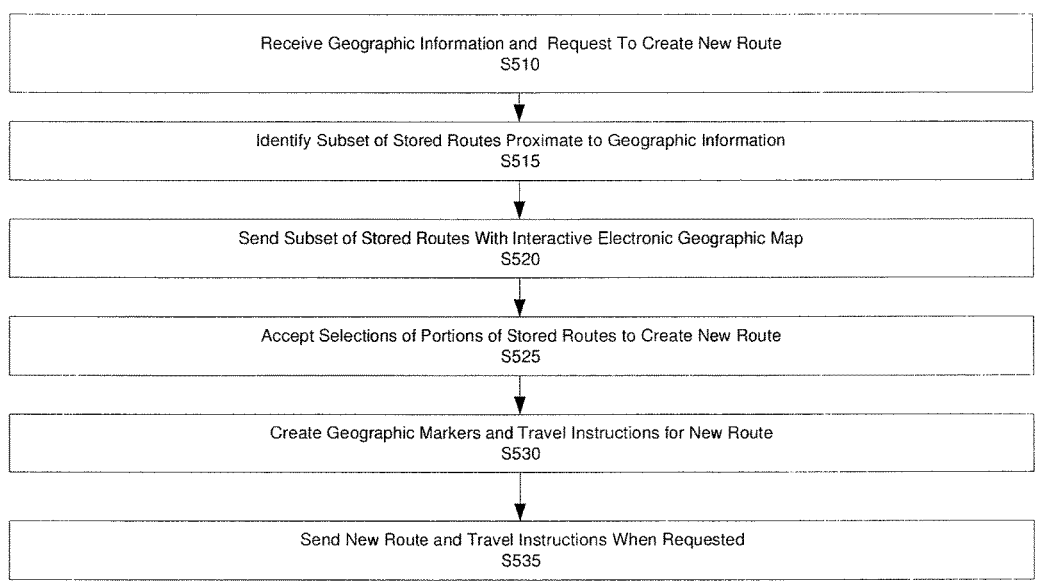
FIG. 5 shows an exemplary method for electronic route creation, according to an aspect of the present disclosure.

FIG. 5 shows an exemplary method for electronic route creation, according to an aspect of the present disclosure. In FIG. 5, geographic/geolocation information is received along with a request to create a new route at S510. The geographic/geolocation information may be an area indicator, such as a zip code or town name, and is used at S515 to identify a subset of stored routes proximate to the geographic information provided. For example, a user who wants to create a route around zip code 60655 may enter 60655 in a search window, and existing stored routes that are correlated with zip code 60655 or nearby zip codes may be retrieved from interactive map database 432 and provided to the user.

The identified routes are sent along with an underlying interactive electronic geographic map at S520. The requesting user can then select portions of any of the provided stored routes in order to generate a new route using the interactive electronic geographic map at S525. For example, routes may be divided at intersections between different routes provided to the requester, so that the user can select a portion that is already predefined between two different intersections. Alternatively, a user may be allowed to designate a starting point and ending point for a section, such as when the section does not intersect another existing route of interest to the user. The user may then designate a new route to connect the designated section with another section of interest to the user.

In another embodiment, when the user has identified a route or series of routes to use as inspiration for a new route, they can select multiple routes to use as templates/guides. In a new window, the routes can be placed into the background of the map where they cannot be physically selected or modified by the user, but can serve as guides for the user to use when drawing the entirety of a new map. Some or all of such a new map may be drawn over portions of the routes shown in the background of the map. In this embodiment, the user creates a completely new route based at least partly on features from the templates/guides in the background layer. When the new route is finished, the user saves, prints and/or exports over a communications network the finished new route. The new route is saved and/or exported in a digital format, and can be used as the basis of navigation instructions.

At S530, geographic markers and travel instructions are created for the new route. The geographic markers may be from information that is provided with an interactive electronic map, or may be provided by the user who is creating the new route. The geographic markers can include landmarks and crossroads, special notes such as that a route crosses a parking lot, and so on. The geographic markers can also include information for cafes or other points of reference or interest. The travel instructions can include instructions on where the new route starts and ends, and how to get to the starting point. The travel instructions can also include instructions for traveling the route, such as turn by turn instructions, distances from one turn to the next, special notes, and characteristics of the route such that it is entirely on pavement or not at all on pavement. At S535, the new route and travel instructions for traveling the new route are sent upon request.

In FIG. 5, a significant feature is that multiple existing routes can be used to create a new route. Additionally, in creating either the unique routes in FIG. 3 or the new routes in FIG. 5, a "bicycle friendly" option may be used in an interactive map to identify potential safe routes. In the context of FIG. 5, such an option may help a user identify potential paths between portions of different existing routes when creating the new route. As an example, a feature on an electronic route creation webpage may be "show bike paths" to identify existing traversable bike paths on the electronic map. Additionally, the option may be used to help find a usable path from a starting point or ending point that is not on one of the multiple existing routes.

Figure 6:
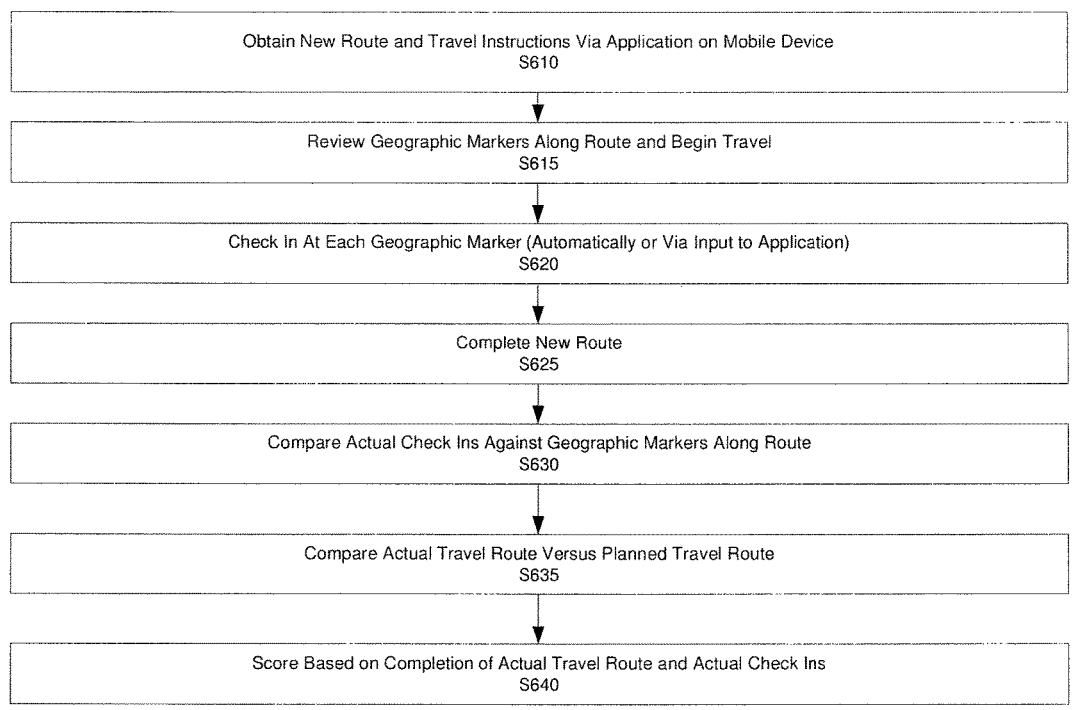
FIG. 6 shows an exemplary method for electronic route creation, according to an aspect of the present disclosure.

FIG. 6 shows an exemplary method for electronic route creation, according to an aspect of the present disclosure. At S610, a new route and travel instructions are retrieved via an application on a mobile device. For example, a user may have an electronic route creation application installed on a smart phone, and use the application to search for and obtain a particular route in Reston, Va. Once an appropriate route is identified, the route is downloaded along with travel instructions for traveling to the start of the route, and then for traveling on the route.

At S615, geographic markers along the route are reviewed, and the user begins to travel the route using the instructions provided at S610. At S620, the user checks in at each of a series of geographic markers, either automatically or by confirming presence via the electronic route creation application. The user may be automatically checked in when the mobile device is within range of a WiFi access point at each location of a geographic marker. That is, local beacons (such as WiFi access points) may be preset to identify when mobile devices with the route creation application are present, and to check the mobile devices in to the geographic markers for which the local beacon is provided.

At S625, the new route is completed by the user. The electronic route creation system can also confirm whether a user receiving the route instructions has actually completed the route. At S630, a comparison is made between the actual check-ins and the geographic markers along the route. The comparison may be made by comparing each check in by the mobile device against a list of check-ins correlated with the route as route information. At S635, the actual travel route is compared versus the planned travel route to confirm that the user has traveled the actual travel route. For example, a GPS service that tracks the user's mobile device may provide GPS locations for the mobile device that can be compared to geographic information of the travel route.

At S640, a score is calculated based on completion of the actual travel route and the actual check-ins as determined in the comparisons at S630 and S635. For example, if a mobile device has checked in to 8 of an expected 10 locations along a travel route, the score might be 80%. Similarly, the comparison at S635 may determine how many times the user was more than 100 meters away from any route location in different 1-minute intervals, and compare the determined number with a preset threshold. For example, if the mobile device was more than 100 meters off of a route in more than 40 different 1-minute intervals, the electronic route application may determine that the user has not successfully traveled the route. Alternatively, if the mobile device was more than 100 meters off of a route on 5 or fewer different 1-minute intervals, the electronic route application may determine that the user has successfully mastered the route.

Figure 7A:
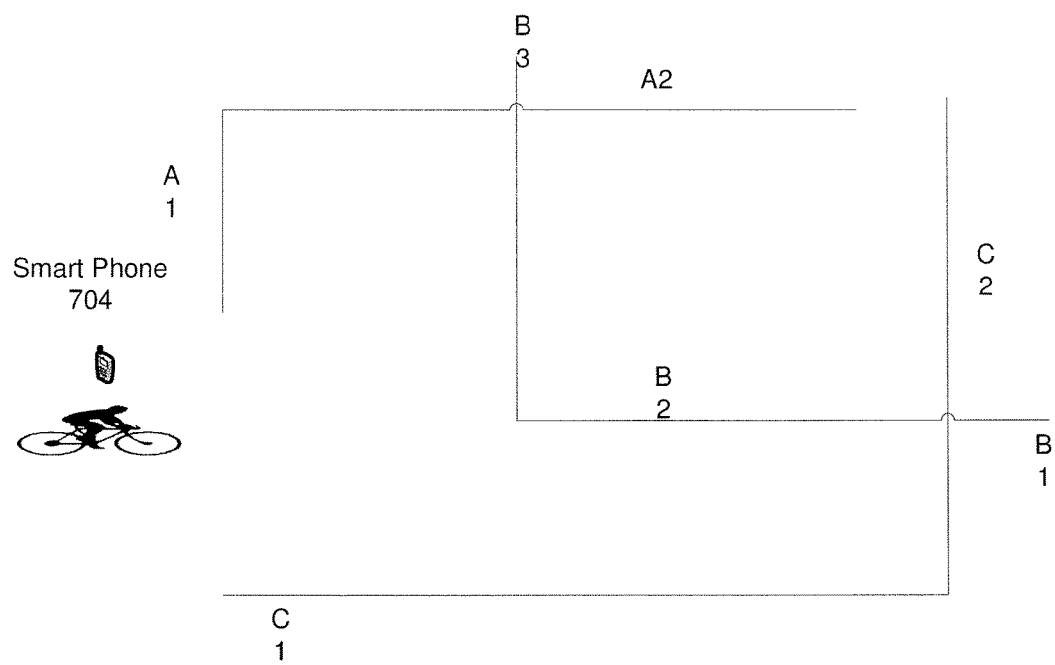
FIG. 7A shows an exemplary template for electronic route creation, according to an aspect of the present disclosure.

FIG. 7A shows an exemplary template for electronic route creation, according to an aspect of the present disclosure. In FIG. 7A, Route A includes two sections, A1 and A2. Route B includes three sections, B1, B2 and B3. Route C includes two sections, C1 and C2.

In FIG. 7A, section A2 of Route A bisects Route Be at sections B2 and B3. Section C3 bisects Route B at sections B1 and B2. A bicycle rider is indicated on FIG. 7A along with a smart phone 704. The bicycle rider can use an electronic route creation application on the smart phone to travel a route once the sections of the route to be traveled are identified.

Figure 7B:
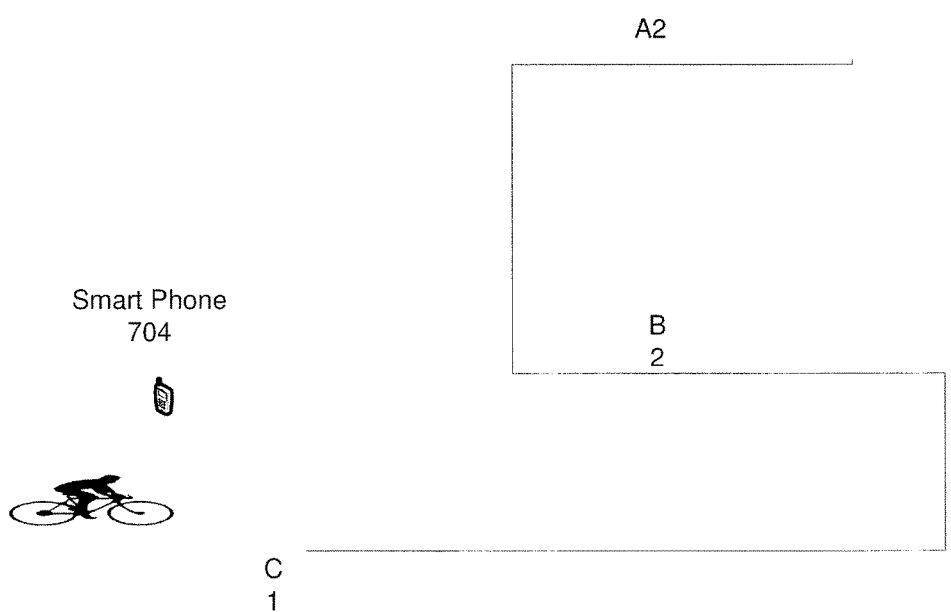
FIG. 7B shows an exemplary route created from a template for electronic route creation, according to an aspect of the present disclosure.

FIG. 7B shows an exemplary route created from a template for electronic route creation, according to an aspect of the present disclosure. In FIG. 7B, the final route to be traveled is shown as including sections C1, B2 and A2 from the various sections shown in FIG. 7A. The sections C1, B2 and A2 are selected from different routes and used in order to create a new route for the user using smart phone 704.

Figure 8:
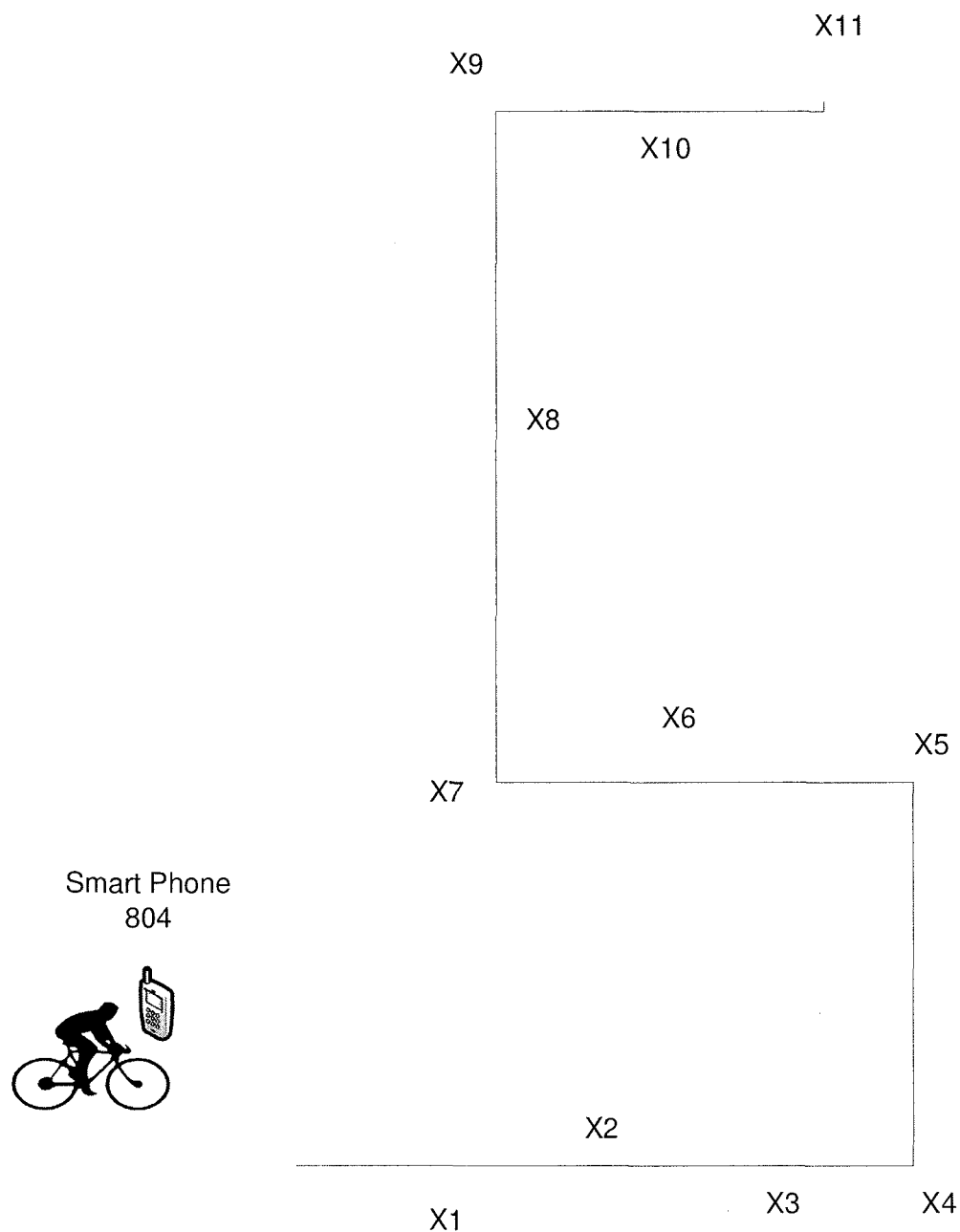
FIG. 8 shows an exemplary route created from a template for electronic route creation, according to an aspect of the present disclosure.

FIG. 8 shows an exemplary route created from a template for electronic route creation, according to an aspect of the present disclosure. In FIG. 8, a route similar to the final route shown in FIG. 7B includes 11 check-in points, labelled X1 through X11. Each of check-in points X1 through X11 may be correlated with specific geographic information such as latitude and longitude of the check-in point, a street address for the check-in point, or a business name for a business at the check-in point. Each of check-in points X1 through X11 may also be correlated with a particular electronic beacon that can be used to check smart phone 804 in via an electronic route creation application on the smart phone 804.

Figure 9:
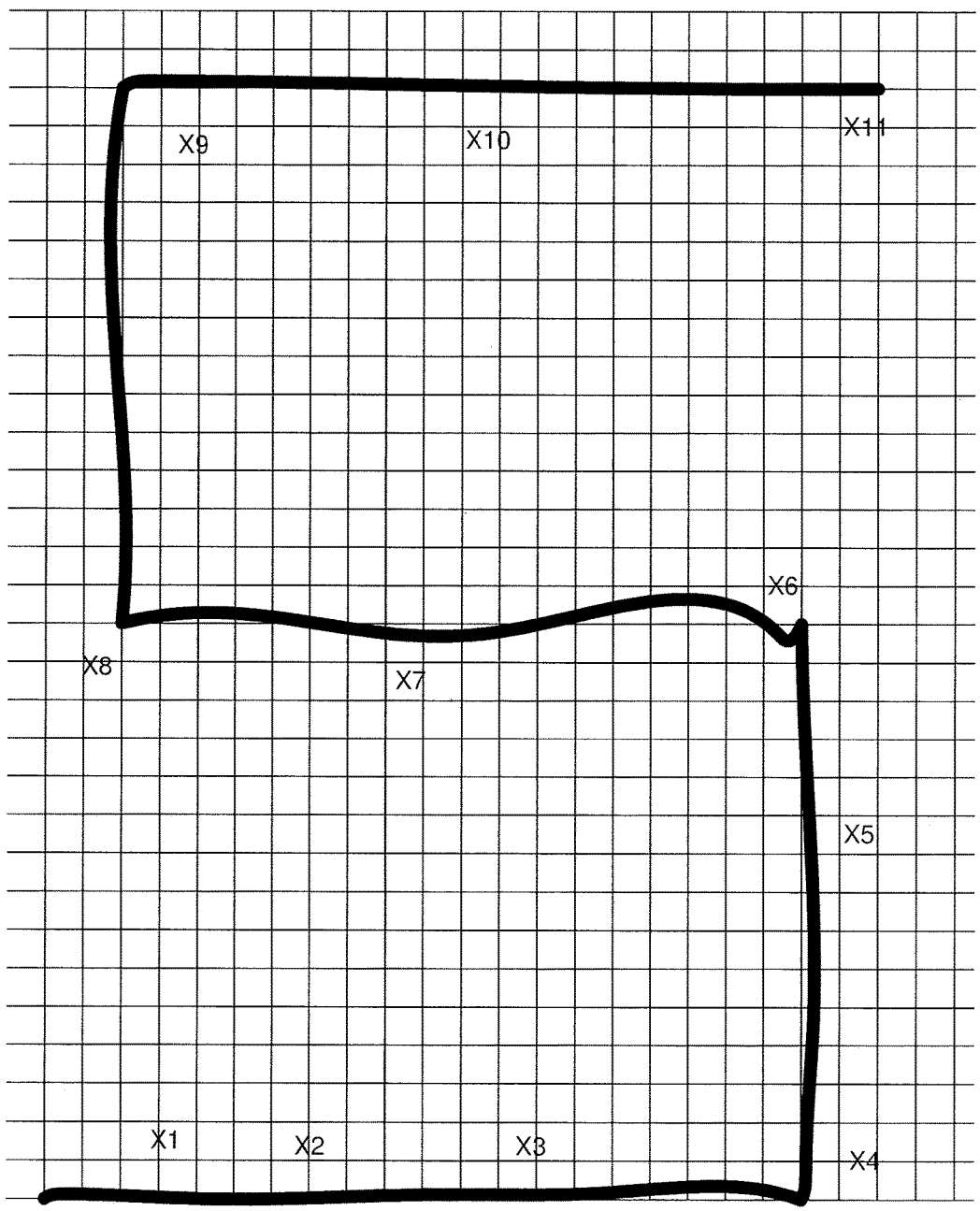
FIG. 9 shows an exemplary route created from a template for electronic route creation, according to an aspect of the present disclosure.

FIG. 9 shows an exemplary route created from a template for electronic route creation, according to an aspect of the present disclosure. In FIG. 9, a user has traced an electronic route on a preset grid, and then identified 11 check-in points X1 through X11. The user may create the route and the check-in points for an entity as part of a contest, so that users who wish to travel the route shown in FIG. 9 may compete to see who can complete the route within guidelines set by the entity. For example, the contest may require that users complete the route in a certain time period such as two hours, or by checking into at least 9 of the 11 check-in points X1 through X11, or by straying off of the designated path by 100 meters or more for no more than 40 minutes during travel or by no more than a set percentage of travel time. Of course, a contest may impose other rules on users who wish to travel the route shown in FIG. 9, and such rules may be set by the entity that creates the route shown. The technology disclosed herein integrates location information and the interactive functionality so as to automatically compare the route with the actual travel and check-ins by the user who travels the route.

In FIG. 9, a rider may complete a route and upload GPS data from a mobile device carried along the route to a website or a downloaded application. The website conveys the GPS data to a processor that then compares the GPS data to a predetermined set of GPS data, in order to determine whether the rider has successfully completed the route. For example, if the GPS comparison shows the rider has completed at least 90% of the route accurately, the website may congratulate the rider and notify the rider of eligibility to claim a reward. Rewards may be provided, for example, by a business or community that sponsors the particular route.

In FIG. 9, navigation instructions can be sent to any mobile device configured to receive such instructions in any form over a communications network. Such a mobile device can include a smart phone running an electronic route creation application. Such a mobile device can also include a GPS-device or other navigation-centric mobile device that uses an imported GPS Exchange Format (GPX) file to display a navigation path. Data conforming to other formats, such as Keyhole Markup Language (KML), can also be used by mobile devices with an electronic route creation application. Additional alternative geographic data formats that can be used for mapping navigation paths include Training Center XML (TCX) and Flexible and Interoperable Data Transfer (FIT), as well as any other appropriate format that can be used within the scope of the teachings in the present disclosure.

Figure 10:
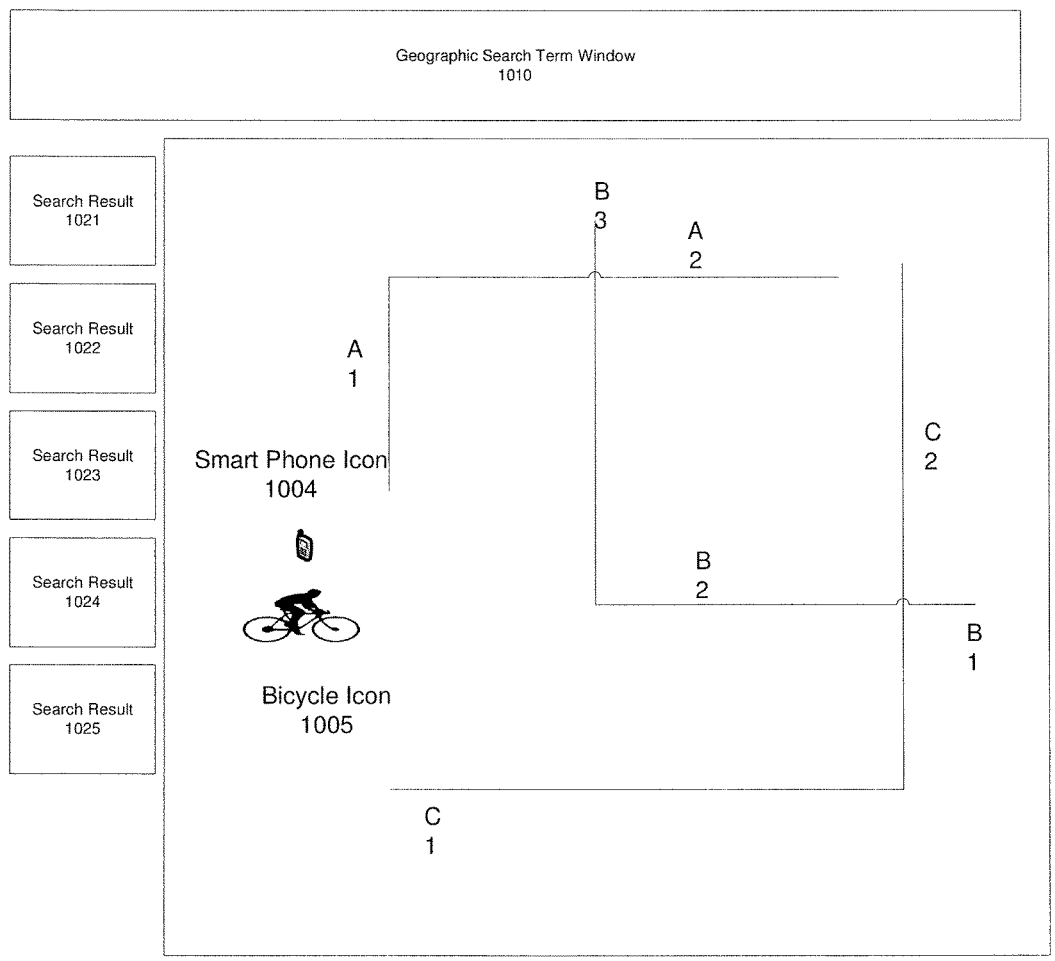
FIG. 10 shows an exemplary website for electronic route creation, according to an aspect of the present disclosure.

FIG. 10 shows an exemplary website for electronic route creation, according to an aspect of the present disclosure. In FIG. 10, a geographic search term window 1010 is provided for a user to search for existing routes geographically. The search results in the three existing routes A, B and C being returned and shown on interactive electronic map 1030. As described herein, the user can select sections of routes A, B and C in order to create a new route, or may input a new section to combine with one or more sections of routes A, B and C in order to create a new route. In FIG. 10, five search result windows 1021, 1022, 1023, 1024 and 1025 are shown. Each search result may show a different result for a search entered into the geographic search term window 1010. Accordingly, a user may select one or more particular search results in one of the windows 1021 to 1025, and the selected result may be used to populate the map 1030 with the route choices shown in FIG. 10. Of course, a different selection may result in a different map area and different set of existing routes being populated on the map 1030 in FIG. 10.

Accordingly, electronic route creation as described herein enables creation of customized routes using confirmed route information from previous travel experiences. New customized routes can be created by piecing together sections of existing customized routes. Additionally, customized routes can be provided as a service, such as for a competition where multiple individuals compete by traveling a customized route created using the features described herein.

Although customized route creation has been described with reference to several exemplary embodiments, it is understood that the words that have been used are words of description and illustration, rather than words of limitation. Changes may be made within the purview of the appended claims, as presently stated and as amended, without departing from the scope and spirit of customized route creation in its aspects. Although customized route creation has been described with reference to particular means, materials and embodiments, customized route creation is not intended to be limited to the particulars disclosed; rather customized route creation extends to all functionally equivalent structures, methods, and uses such as are within the scope of the appended claims.

For example, the disclosure herein describes customized route creation mainly in the context of routes for bicyclists to travel. However, customized route creation may be applicable to users who travel on foot, or horseback, or via other mechanisms of travel. Additionally, the disclosure herein describes customized route creation as being desktop and smartphone applications. However, customized route creation may be provided via a webpage that a user can visit, even if the user is required to log in or even pay to use the customized route creation provided via the webpage. Additionally, customized route creation may be provided via a standalone software program, provided as a service (software as a service) or as a packaged item with an electronic storage (e.g., disk) purchased from an online or retail outlet.

Additionally, electronic route creation provides an ability for users to create new routes from multiple previous routes, as well as to identify features that are "bicycle friendly" to fill in gaps between sections of the multiple previous routes. In this way, uses can search for and use particular characteristics when building individual sections of a route to traverse. Such characteristics include characteristics described herein, but are not limited to the exemplary characteristics described herein. Rather, any identifiable characteristics that might be important to a user creating an electronic route as described herein may be shown in an application or website for a user to select.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a method of creating an electronic travel route includes providing a user interface that includes electronic geographic maps. Routes created by users using the user interface are stored. The routes include mapped electronic routes in the electronic geographic maps along which the users have traveled. The method includes receiving geographic information and a request from a requester to create a new route and, based on the geographic information and the request, providing to the requester a subset of the routes stored. Selections of portions of the subset of the routes stored are accepted from the requester to create the new route. A set of geographic markers and instructions for traversing the new route are created using a processor of a computer and based on the new route. The new route and instructions for traversing the new route are provided based on a search.

According to another aspect of the present disclosure, the user interface is provided over a communications network to users visiting a website.

According to yet another aspect of the present disclosure, the method further includes providing, based on the search, the new route and instructions via a wireless network to a mobile device.

According to still another aspect of the present disclosure, the method includes providing an application for the mobile device to search for new routes and instructions.

According to another aspect of the present disclosure, the method includes providing, for installation on a computer, an application for the requester to use to create the new route.

According to yet another aspect of the present disclosure, the method further includes ordering search results that include routes based on the search, and providing the ordered search results to the requester.

According to still another aspect of the present disclosure, the search results are ordered based on geographic proximity to a location specified in the search.

According to another aspect of the present disclosure, the search results are ordered based on popularity of creators of the routes.

According to yet another aspect of the present disclosure, the search results are ordered based on popularity of the route based on previous uses of the route.

According to still another aspect of the present disclosure, the search results are ordered based on a status of the route creator.

According to another aspect of the present disclosure, the search results are ordered based on information of the route creator.

According to yet another aspect of the present disclosure, the method is implemented using a centralized server in a network.

According to still another aspect of the present disclosure, the new route is a route accessible to bicycles.

According to another aspect of the present disclosure, the new route includes portions inaccessible to motorized vehicles.

According to yet another aspect of the present disclosure, the method includes sending the new route to communications addresses specified by a user performing the search.

According to still another aspect of the present disclosure, the method includes providing to a user an interactive map that allows the requester to create a route.

According to another aspect of the present disclosure, the interactive map allows the requester to create a route by manipulating a cursor through the interactive map to create the route.

According to yet another aspect of the present disclosure, the interactive map allows the requester to create a route by manipulating a finger along a screen displaying the interactive map to create the route.

According to an aspect of the present disclosure, a tangible non-transitory computer readable storage medium stores a computer program. The computer program, when executed by a processor, causing a computer apparatus to perform a process. The process includes providing a user interface that includes electronic geographic maps. Routes created by users using the user interface are stored. The routes include mapped electronic routes in the electronic geographic maps along which the users have traveled. The method includes receiving geographic information and a request from a requester to create a new route and, based on the geographic information and the request, providing to the requester a subset of the routes stored. Selections of portions of the subset of the routes stored are accepted from the requester to create the new route. A set of geographic markers and instructions for traversing the new route are created using a processor of a computer and based on the new route. The new route and instructions for traversing the new route are provided based on a search. The process also includes confirming whether a user receiving the instructions has completed the route based on comparing predetermined route information with geographic information collected on a device along the new route.

According to an aspect of the present disclosure, a computer apparatus includes a memory that stores instructions, and a processor that executes the instructions. When executed by the processor, the instructions cause the processor to perform operations that include providing a user interface that includes electronic geographic maps. Routes created by users using the user interface are stored. The routes include mapped electronic routes in the electronic geographic maps along which the users have traveled. The method includes receiving geographic information and a request from a requester to create a new route and, based on the geographic information and the request, providing to the requester a subset of the routes stored. Selections of portions of the subset of the routes stored are accepted from the requester to create the new route. A set of geographic markers and instructions for traversing the new route are created using a processor of a computer and based on the new route. The new route and instructions for traversing the new route are provided based on a search.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of creating an electronic travel route, comprising:
providing a user interface comprising electronic geographic maps;
storing a plurality of routes created by users using the user interface comprising electronic geographic maps, the routes comprising mapped electronic routes in the electronic geographic maps along which the users have traveled;
receiving geographic information and a request from a requester to create a new route and, based on the geographic information and the request, providing to the requester a subset of the plurality of routes stored, and
accepting, from the requester, selections of portions of the subset of the plurality of the routes stored to create the new route,
creating, using a processor of a computer and based on the new route, a set of geographic markers and instructions for traversing the new route, and
providing, based on a search, the new route and instructions for traversing the new route.

2. The method of claim 1,
wherein the user interface is provided over a communications network to users visiting a website.

3. The method of claim 1, further comprising:
providing, based on the search, the new route and instructions via a wireless network to a mobile device.

4. The method of claim 3, further comprising:
providing an application for the mobile device to search for new routes and instructions.

5. The method of claim 1, further comprising:
providing, for installation on a computer, an application for the requester to use to create the new route.

6. The method of claim 1, further comprising:
ordering search results comprising routes based on the search, and providing the ordered search results to the requester.

7. The method of claim 6,
wherein the search results are ordered based on geographic proximity to a location specified in the search.

8. The method of claim 6,
wherein the search results are ordered based on popularity of creators of the routes.

9. The method of claim 6,
wherein the search results are ordered based on popularity of the route based on previous uses of the route.

10. The method of claim 6,
wherein the search results are ordered based on a status of the route creator.

11. The method of claim 6,
wherein the search results are ordered based on information of the route creator.

12. The method of claim 1,
wherein the method is implemented using a centralized server in a network.

13. The method of claim 1,
wherein the new route is a route accessible to bicycles.

14. The method of claim 13,
wherein the new route includes portions inaccessible to motorized vehicles.

15. The method of claim 1, further comprising:
sending the new route to communications addresses specified by a user performing the search.

16. The method of claim 1, further comprising:
providing to a user an interactive map that allows the requester to create a route.

17. The method of claim 16,
wherein the interactive map allows the requester to create a route by manipulating a cursor through the interactive map to create the route.

18. The method of claim 16,
wherein the interactive map allows the requester to create a route by manipulating a finger along a screen displaying the interactive map to create the route.

19. A tangible non-transitory computer readable storage medium that stores a computer program, the computer program, when executed by a processor, causing a computer apparatus to perform a process comprising:
providing a user interface comprising electronic geographic maps;
storing a plurality of routes created by users using the user interface comprising electronic geographic maps, the routes comprising mapped electronic routes in the electronic geographic maps along which the users have traveled;
receiving geographic information and a request from a requester to create a new route and, based on the geographic information and the request, providing to the requester a subset of the plurality of routes stored;
accepting, from the requester, selections of portions of the subset of the plurality of the routes stored to create the new route;
creating, using a processor of a computer and based on the new route, a set of geographic markers and instructions for traversing the new route;
providing, based on a search, the new route and instructions for traversing the new route, and
confirming whether a user receiving the instructions has completed the route based on comparing predetermined route information with geographic information collected on a device along the new route.

20. A computer apparatus, comprising:
a memory that stores instructions, and
a processor that executes the instructions,
wherein, when executed by the processor, the instructions cause the processor to perform operations comprising:
providing a user interface comprising electronic geographic maps;
storing a plurality of routes created by users using the user interface comprising electronic geographic maps, the routes comprising mapped electronic routes in the electronic geographic maps along which the users have traveled;
receiving geographic information and a request from a requester to create a new route and, based on the geographic information and the request, providing to the requester a subset of the plurality of routes stored; and accepting, from the requester, selections of portions of the subset of the plurality of the routes stored to create the new route;

creating, using a processor of a computer and based on the new route, a set of geographic markers and instructions for traversing the new route, and providing, based on a search, the new route and instructions for traversing the new route.

* * * * *